Nov. 11, 1958    S. C. PELLEGRINO    2,859,791
SEGMENTAL TIRE AND WHEEL ASSEMBLY
Filed Feb. 15, 1957    2 Sheets-Sheet 1
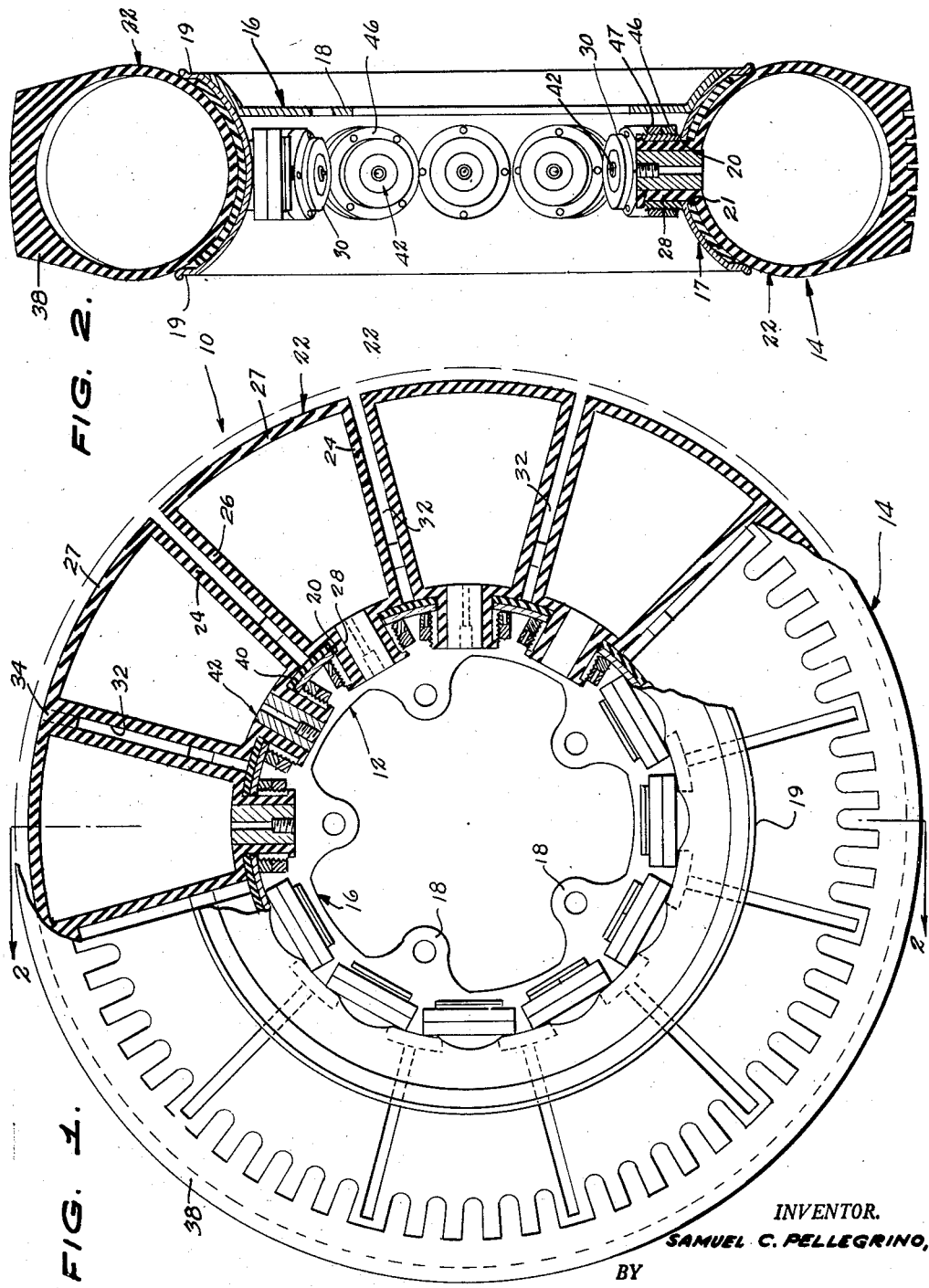
INVENTOR.
SAMUEL C. PELLEGRINO,
BY
McMorrow, Berman + Davidson
ATTORNEYS.

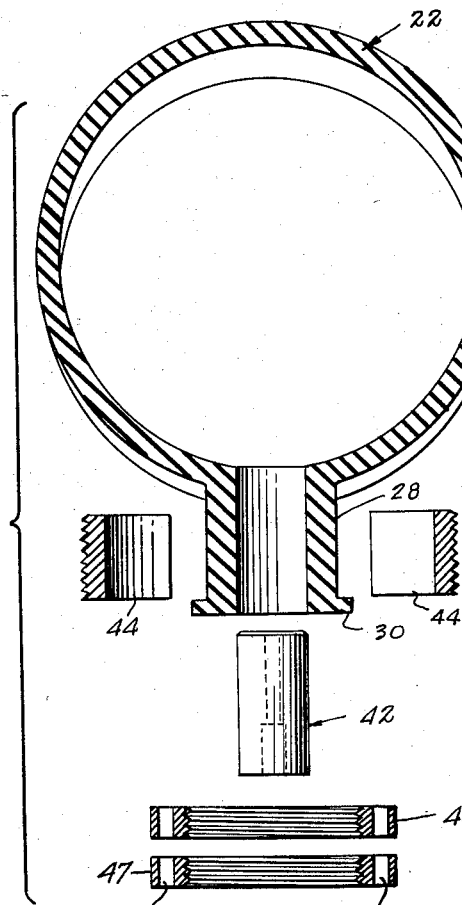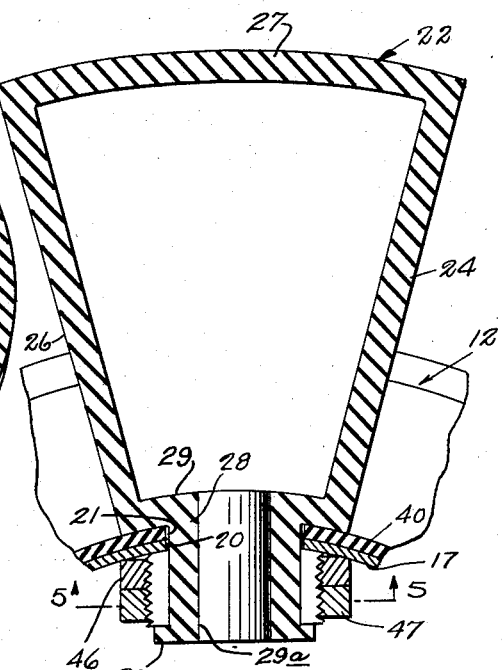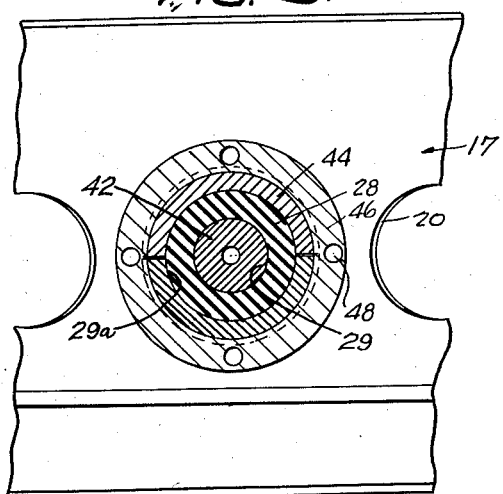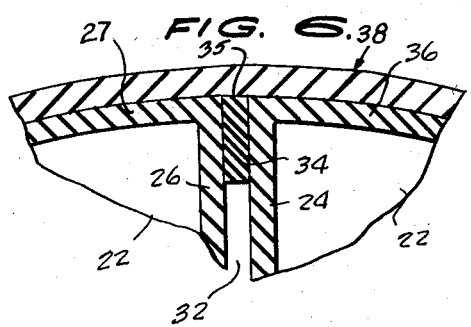

ized Nov. 11, 1958

2,859,791
SEGMENTAL TIRE AND WHEEL ASSEMBLY

Samuel C. Pellegrino, Buffalo, N. Y.

Application February 15, 1957, Serial No. 640,511

4 Claims. (Cl. 152—334)

This invention relates to an improved segmental tire and wheel assembly.

The primary object of the invention is to provide a more practical and efficient assembly of this kind which involves a tire composed of independent segmental cells, adjacent end walls of adjacent cells being spaced from each other, with relatively narrow spacing strips positioned in the spaces and secured to the adjacent walls and readily cut therefrom for replacement of a damaged cell, and a tread vulcanized on the radially outward walls of the cells and bridging the spaces between the cells.

Another object of the invention is to provide an assembly of the character indicated above wherein the individual cells have integral mounting stems on their radially inward walls which extend radially inwardly through openings in a resilient liner on the wheel rim and in the rim, the stems having thereon metal sleeves on which are threaded rim engaging retaining nuts, and tire valves in the stems which communicate with the cells.

A further object of the invention is to provide a segmental tire and wheel assembly of the character indicated, which can be made in rugged and serviceable forms at relatively low cost, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is an outboard side elevation of a segmental tire and wheel assembly of the invention, portions being broken away and in section;

Figure 2 is a vertical transverse section taken substantially on the plane of line 2—2 of Figure 1;

Figure 3 is an enlarged exploded transverse sectional view taken through one of the tire segments;

Figure 4 is an enlarged fragmentary longitudinal sectional view taken through a tire segment and a wheel rim;

Figure 5 is a fragmentary horizontal section taken substantially on the plane of line 5—5 of Figure 4; and Figure 6 is an enlarged fragmentary longitudinal sectional view taken through two adjacent tire segments and the tread of the tire.

Referring to the drawings in detail, the illustrated segmental tire and wheel assembly, generally designated 10, comprises a wheel 12, and a segmental tire 14 thereon.

The wheel 12 comprises a web 16 composed of circumferentially spaced inwardly projecting bolt receiving lugs 18 by means of which the wheel is bolted on a vehicle wheel hub (not shown). On the web 16 is an annular rim 17 of arcuate convex-concave cross section which terminates at its inboard and outboard side edges in retaining flanges 19. As shown in Figure 2, the web 16 is offset to the inboard side of the rim 17.

The segmental tire 14 comprises a plurality of independently inflatable pneumatic tire segments or cells 22 of circular transverse cross section, which have converging end walls 24 and 26, and curved outer walls 27 and inner walls 29. On and projecting radially inwardly from the inner walls 29 are integral tubular mounting stems 28 having lateral annular flanges 30 on their inward ends.

As clearly shown in Figure 1, adjacent tire cells 22 are circumferentially spaced from each other to define radial spaces 32 therebetween. Relatively narrow transverse spacing strips 34 are positioned between adjacent end walls of adjacent tire cells 22 and have their outer edges 35 flush with the outer sides of the outer walls 27 of the cells, as shown in Figure 6. Vulcanized on the outer cell walls 27 and the strips 34 is a camel-back tread 38.

On the rim 17 is a liner 40 of resilient material.

The mounting stems 28 have axial bores 29a in which are suitably secured inflating valve assemblies indicated generally at 42. The stems 28 are inserted inwardly through accommodating holes 21 and 20, in the liner 40 and the rim 17, respectively. Circumposed on the stems 28 between the rim 17 and the flanges 30 are split threaded sleeves 44. Threaded on the sleeves 44 are outer and inner spanner nuts 46 and 47, having therein holes 48 for receiving the pins of a spanner wrench.

The independently inflated tire cells 22 can be assembled and the tread 38 applied in a vulcanizing mold replacing the "tire bag" utilized with conventional tires. The liner 40 may be utilized as a spacing medium for increasing the over-all diameter of the tire, for example. The spacing strips 34 between adjacent tire cells 22 serve to distribute the load of the vehicle on the tire, and in the event one of the tire cells becomes punctured or blown out, these strips, being vulcanized to the defective tire cell, will prevent the same from separating from adjacent tire cells. Replacement of the independent tire cells is accomplished by loosening the spanner nuts 46 and 47, cutting the tread 38 and spacer strips adjacent the defective tire cell and replacing the cell and vulcanizing the new cell in place. However, it is not necessary to immediately replace a damaged cell because the remaining inflated cells have sufficient buoyancy to support the weight of a vehicle.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In a tire and wheel assembly, a concave wheel rim, a tire on the rim comprising a plurality of resilient segmental cells having outer walls, inner walls, and radially inwardly converging end walls, the adjacent end walls of adjacent cells being spaced from each other, said rim being provided with circumferentially spaced holes therethrough, said inner walls of the cells having thereon resilient mounting stems extending radially inwardly through the rim holes, retaining means on the stems inwardly of the rim and bearing against the rim, relatively narrow transverse spacing strips positioned in the spaces between adjacent cells and secured to related end walls thereof, and inflating valves in the mounting stems.

2. In a tire and wheel assembly, a concave wheel rim, a tire on the rim comprising a plurality of resilient segmental cells having outer walls, inner walls, and radially inwardly of the rim and bearing against the rim, relaadjacent cells being spaced from each other, said rim being provided with circumferentially spaced holes therethrough, said inner walls of the cells having thereon resilient mounting stems extending radially inwardly through the rim holes, retaining means on the stems inwardly of the rim and bearing against the rim, relatively narrow transverse spacing strips positioned in the spaces between adjacent cells and secured to related end walls thereof, and inflating valves in the mounting stems, and a resilient tread secured on the outer walls of the cells and bridging the spaces between the cells.

3. In a segmental tire, a plurality of circumferentially arranged individual resilient cells having inner walls, resilient mounting stems on and projecting radially inwardly from said inner walls for engagement through holes in a wheel rim, inflating valves in said stems, said stems having inward ends having lateral flanges thereon, split sleeves circumposed on the stems outwardly of said flanges, and retaining nut means threaded on said sleeve to bear against the side of a wheel rim remote from the tire.

4. In a segmental tire, a plurality of circumferentially arranged individual resilient cells having inner walls, resilient mounting stems on and projecting radially inwardly from said inner walls for engagement through holes in a wheel rim, inflating valves in said stems, said stems having inward ends having lateral flanges thereon, split sleeves circumposed on the stems outwardly of said flanges, and retaining nut means threaded on said sleeve to bear against the side of a wheel rim remote from the tire, and a resilient rim liner against which the inner walls of the cells bear, the liner being positioned between the inner walls of the cells and a wheel rim and having holes through which the cell stems project.

References Cited in the file of this patent

UNITED STATES PATENTS

| 855,818 | Smith | June 4, 1907 |
| 1,274,237 | Boryszewski | July 30, 1918 |
| 1,293,498 | Mariono | Feb. 4, 1919 |